United States Patent [19]

Dote

[11] Patent Number: 5,221,083

[45] Date of Patent: Jun. 22, 1993

[54] MEDAL GAME MACHINE

[75] Inventor: Singo Dote, Tokyo, Japan

[73] Assignee: Sega Enterprises, Ltd., Tokyo, Japan

[21] Appl. No.: 593,696

[22] Filed: Oct. 5, 1990

[30] Foreign Application Priority Data

Oct. 17, 1989 [JP] Japan ................... 1-271025

[51] Int. Cl.⁵ ............................................... A63F 1/00
[52] U.S. Cl. .............................. 273/85 CP; 273/85 G; 273/DIG. 28; 353/37
[58] Field of Search ........ 273/85 CP, 85 G, DIG. 28, 273/161, 138 A, 313, 316, 355, 358; 353/28, 30, 37, 74, 77, 94; 248/917-924

[56] References Cited

U.S. PATENT DOCUMENTS

| | | | |
|---|---|---|---|
| 3,790,172 | 2/1974 | Nakamura | 273/313 |
| 4,189,145 | 2/1980 | Stubben et al. | 272/DIG. 28 |
| 4,265,449 | 5/1981 | Reiner et al. | 273/85 G |
| 4,306,768 | 12/1981 | Egging | 273/85 G |
| 4,403,216 | 9/1983 | Yokoi | 273/85 G |
| 4,421,317 | 12/1983 | Hector et al. | 273/313 |
| 4,490,745 | 12/1984 | Erickson et al. | 273/85 G |
| 4,614,342 | 9/1986 | Takashima | 273/85 CP |
| 4,710,873 | 12/1987 | Breslow et al. | 273/DIG. 28 |

FOREIGN PATENT DOCUMENTS

| | | | |
|---|---|---|---|
| 3511850 | 11/1986 | Denmark | 273/DIG. 28 |
| 8002233 | 10/1980 | PCT Int'l Appl. | 273/DIG. 28 |
| 2124505 | 2/1984 | United Kingdom | 273/DIG. 28 |

OTHER PUBLICATIONS

Stephen D. Bristow, The History of Video Games, IEEE Tranactions on Consumer Electronics, Feb. 1977, pp. 58-68.
Ed Edelson, Popular Science, 3-D optical blender, Nov. 1983, pp. 98-99.

Primary Examiner—V. Millin
Assistant Examiner—Steven B. Wong
Attorney, Agent, or Firm—Price, Gess & Ubell

[57] ABSTRACT

A medal game machine adapted to use a multiplicity of medals and to apportion them to the player who bet medals and won in a game. The machine comprises an enclosure having an open central portion on its front side, a display unit mounted in the center of the head portion of the enclosure, a flat half mirror located below the display unit, a georama forming a background, illuminators equipped with dimmers for illuminating the georama, and satellites mounted outside the front of the enclosure. The half mirror is inclined at about 45° and extends downwardly toward the front of the enclosure from a high position on the rear surface of the enclosure. The georama is fixedly mounted on the rear surface of the enclosure behind the position at which a virtual image of the picture on the display unit is created by the half mirror. The satellites can be operated by human players.

8 Claims, 4 Drawing Sheets

5,221,083

MEDAL GAME MACHINE

BACKGROUND OF THE INVENTION

1. Field of the Invention

The present invention relates to a medal or coin game machine which simulates the behavior of the dealer, unlike card game machines, presently installed in penny arcades or the like.

2. Description of the Prior Art

A conventional blackjack game machine which uses medals or coin and is employed for business purposes and comprises an enclosure, a display portion showing dealer's cards, and another display portion showing player's cards. These display portions are placed in position on top of the enclosure. These display portions may mechanically expose cards or may be CRTs which display the images of cards. A player inserts medals into the metal slot to bet them. Then, the player pushes buttons on the control section to distribute the cards, for playing a game. If he or she wins, medals corresponding in number to the amount of bet will be placed on the medal pan.

In the above-described blackjack game machine, dealer's cards and player's cards are displayed on their respective display portions to permit the player to play a game. The player merely makes the game progress while matching the viewing screens. Therefore, the player only feels that he or she is playing a computer game and does not feel as if a real human dealer distributed cards, i.e., the blackjack game is not played realistically.

SUMMARY OF THE INVENTION

In view of the foregoing problem with the prior art metal game machine, it is an object of the present invention to provide a medal game machine which makes the player feel as if he or she played a blackjack game with a real human dealer within a real casino.

The above object is achieved by a game machine comprising: a boxlike enclosure or housing member having an open central portion on its front side; a first display unit mounted in the center of the head or upper portion of the enclosure, the viewing screen of the display unit facing downward; a flat semi-transparent half mirror mounted below the first display unit and inclined at an angle of about 45° so as to extend downwardly from an upper position on the rear side of the enclosure to the front side of the enclosure, the half mirror creating a virtual image of the picture displayed on the viewing screen of the first display unit immediately under the first display unit such that the picture on the viewing screen of the first display unit and the virtual image are located symmetrically with respect to the half mirror; a flat plane simulating a table and located below the open central portion of the front side of the enclosure, the flat plane extending inwardly of the enclosure, the rear side of the flat plane being close to the plane on which the virtual image is projected.

A second display unit can be mounted immediately under the first display unit on the flat plane. A background georama is disposed on the rear inner surface of the enclosure behind the position at which the virtual image of the picture on the first display unit is projected by the half mirror. The georama is illuminated by lights equipped with dimmers. Satellites are mounted outside the front of the enclosure. A display unit, a control unit, and a coin receiver are mounted on top of the body of each satellite.

In one feature of the novel medal game machine, the half mirror disposed in front of the georama at an angle creates the virtual image of the picture displayed on the first display unit located just above the half mirror. The virtual image and the picture on the first display unit are symmetrical with respect to the half mirror. The virtual image is located between the table and the georama which is seen through the half mirror. The virtual image can be matched to the georama by adjusting the illumination incident on the georama. The player operates the machine while watching the virtual image projected against the georama, as well as the image displayed on one of the satellites.

DETAILED DESCRIPTION OF THE PREFERRED EMBODIMENTS

Figure 1:
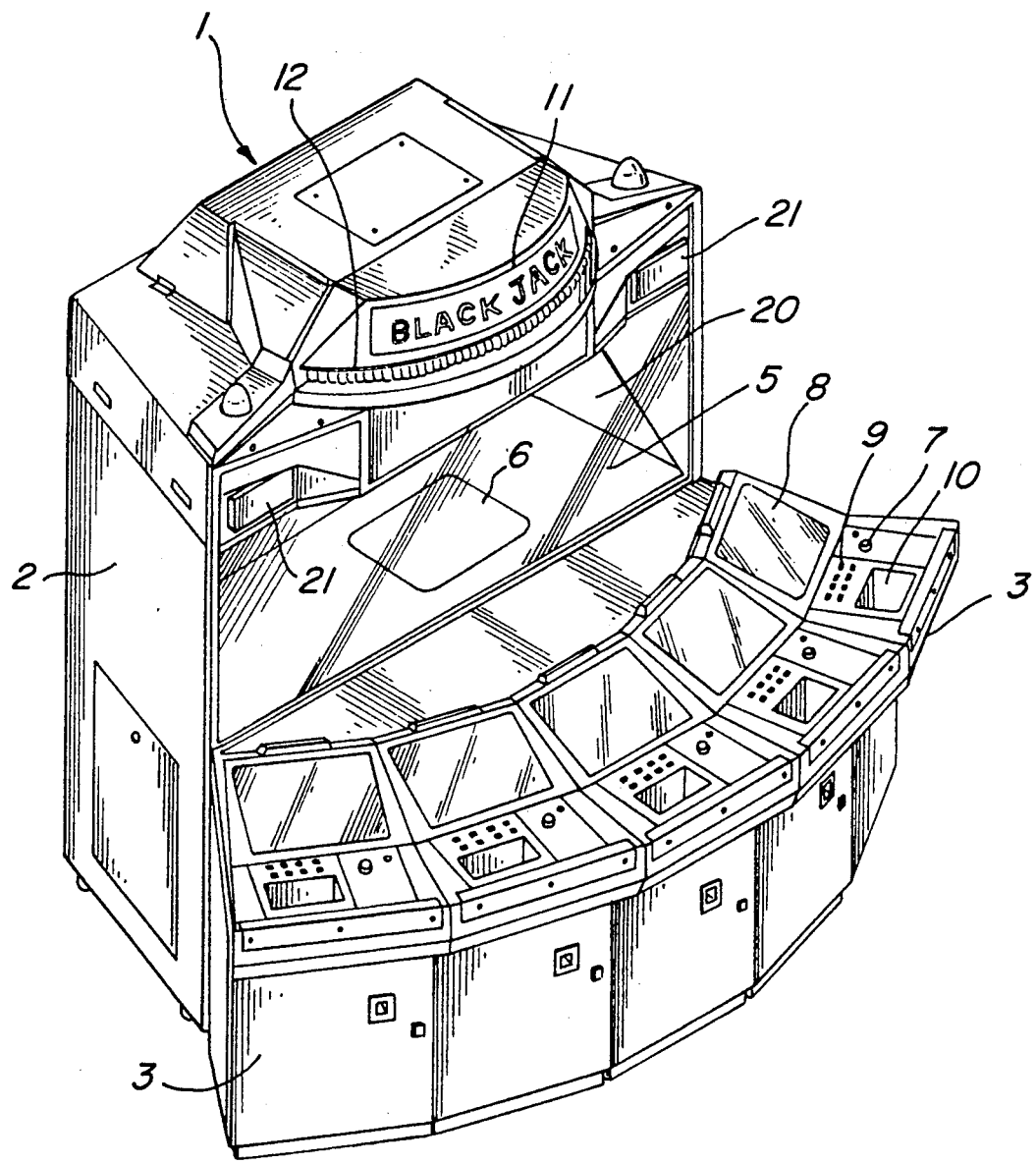
FIG. 1 is a perspective view of a medal game machine according to the invention.
Figure 2:
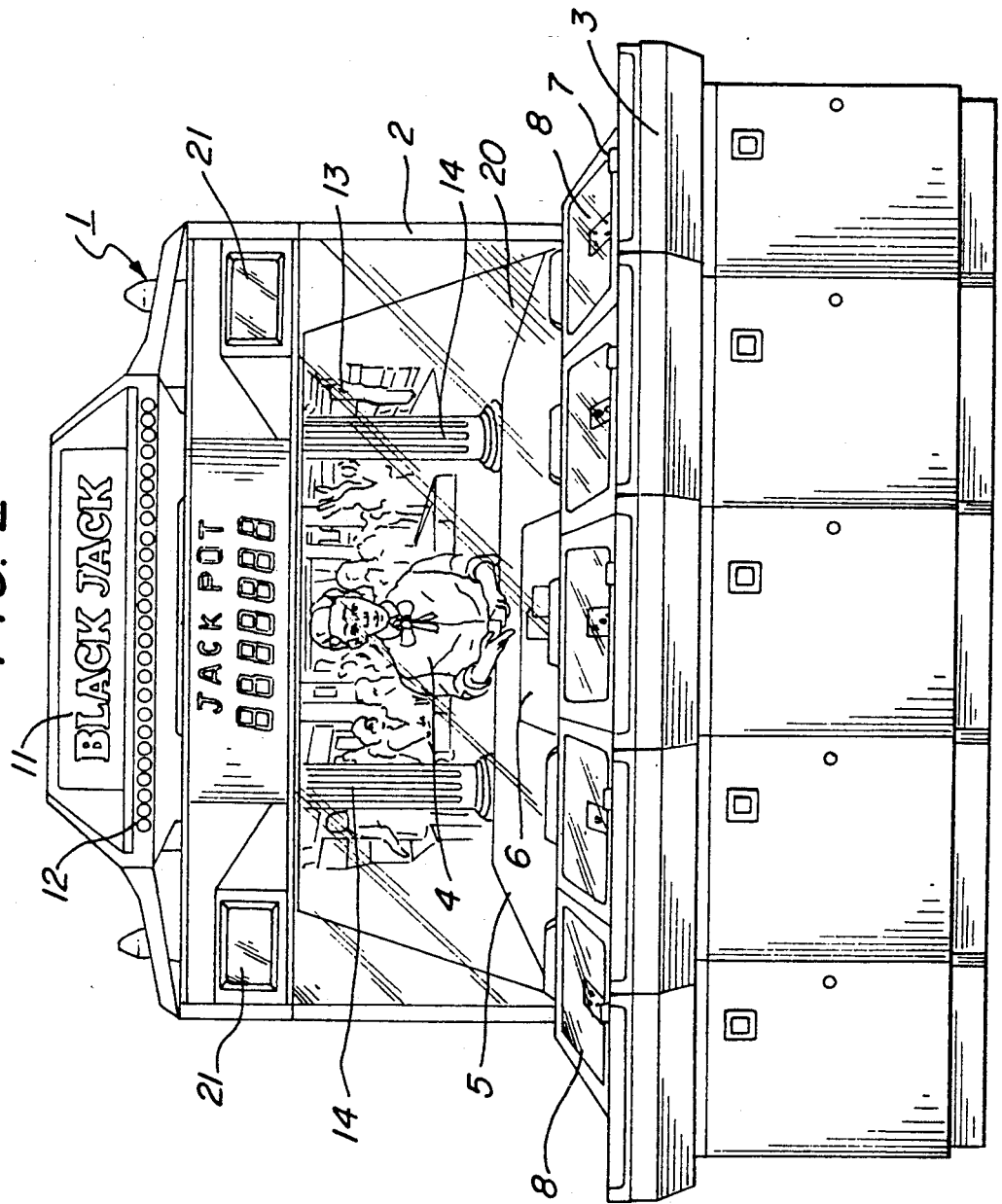
FIG. 2 is a front elevation of the machine shown in FIG.

Referring to FIGS. 1 and 2, there is shown a medal game machine embodying the concept of the invention. This machine, generally indicated by numeral 1, comprises an upright portion or housing member 2 and a plurality of satellites or generator units 3. An image of a dealer 4 is located in the upright portion 2, while human players (not shown) stand by the satellites 3. Images are displayed on the machine 1 under the control of a computer. Games are made to proceed smoothly also under the control of the computer.

A table 5 is disposed in front of the dealer 4. A cathode-ray tube (CRT) 6 displaying dealer's cards is mounted in the center of the table.

The dealer 4 delivers his or her cards on the CRT 6 mounted on the table 5 located ahead of the dealer. The players insert medals (not shown) into the medal slots 7 in the satellites 3 to bet. The players' cards are displayed on the CRTs 8 of the satellites 3. The players judge the circumstances while watching the CRTs 8 of their respective satellites 3, and push operation buttons 9 on the control sections of the satellites. Thus, cards are distributed, and the game is made to progress. The winner of the game receives the apportioned medals on a medal pan 10.

A billboard 11 is equipped with numerous illuminations 12 on its side surface. These illuminations are successively lit up to create a flowing illuminant.

A casino's background 13 or georama is formed on the inner surface of the rear side of the upright portion 2. Semicylindrical pillars 14 are mounted in front of the background and on opposite sides to create a near view, thus accentuating the three-dimensionality. The table 5 is disposed in front of the pillars 14 and tilted slightly forwardly. The CRT 6 is mounted in the center of the table 5. The dealer 4 delivers cards onto the CRT 6 on the table 5 and also onto the CRTs 8 of the satellites. The satellites providing plager positions with appropriate operator controls and displays. The table 5 is tilted so that the players standing by the satellites may have a better look at the dealer's cards. Of course, the table 5 can be rendered horizontal.

Figure 3:
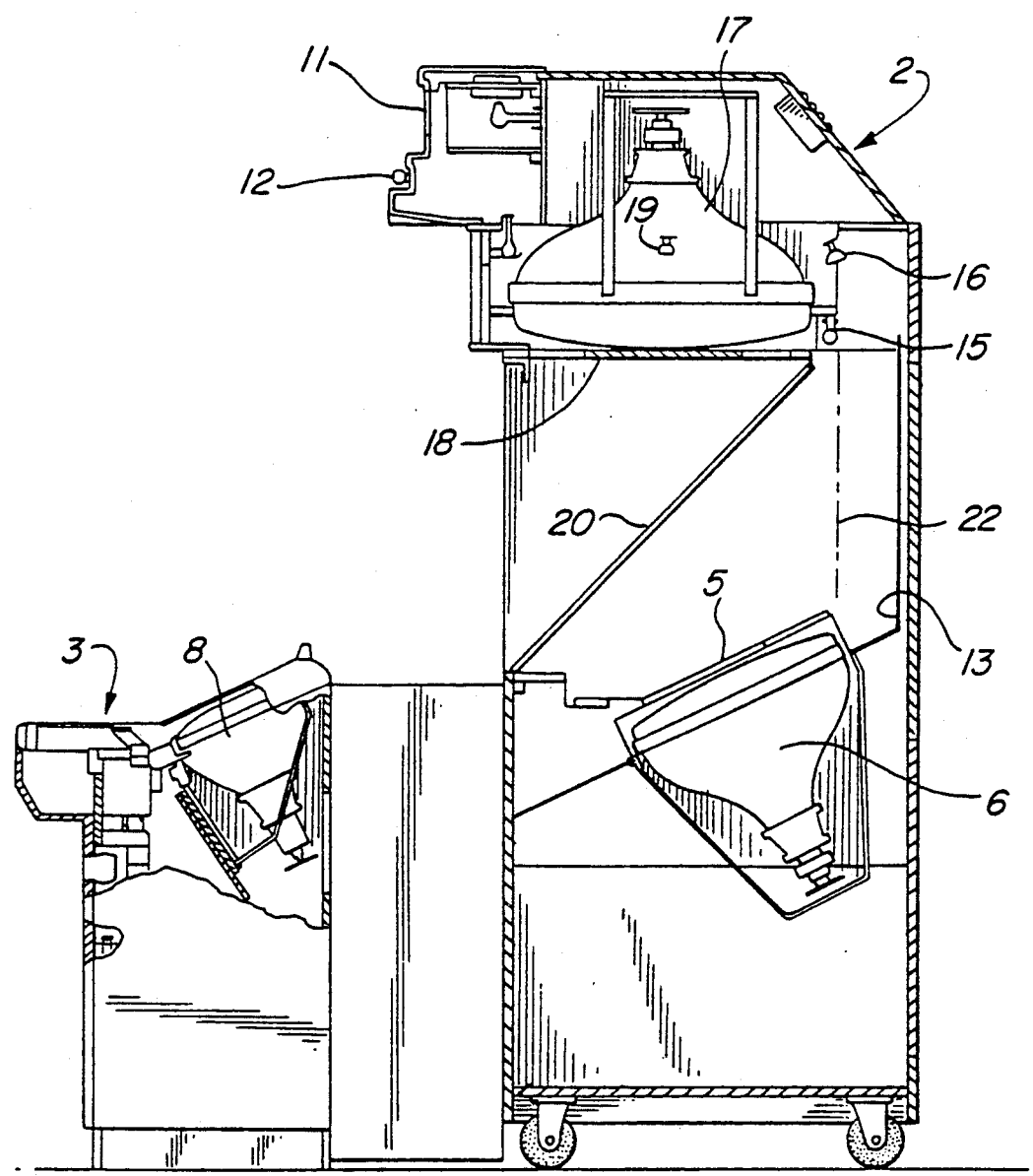
FIG. 3 is a cross-sectional view taken through the center of the machine shown in FIG. 1.
Figure 4:
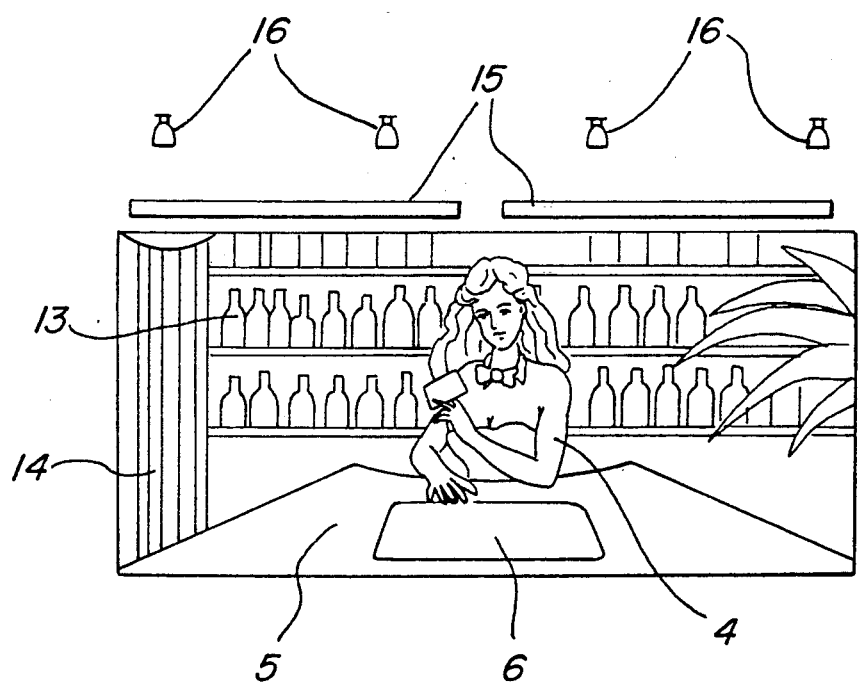
FIG. 4 is a front elevation of a georama different from the georama shown in FIG. 2.

FIG. 3 is a horizontal cross section taken through the center of the medal game machine shown in FIGS. 1 and 2. FIG. 4 is a front elevation of another georama, and in which a dealer stands against shelves holding the bottles of wines and liquors. As shown in these figures, black lights 15 are mounted just above the georama and directed toward it. Spotlights 16 are mounted at the top of the georama to illuminate the center and both ends of the georama.

A CRT 17 is fixed horizontally inside the upper portion of the upright portion 2 and located just above the center of the table 5 such that the viewing screen faces downward. The upper part of the body of the dealer 4 is displayed on this viewing screen. Transparent guide plates 18 are mounted above the opposite pillars 14 and on the opposite sides of the viewing screen of the CRT 17. Spotlights 19 are disposed inside the guide plates 18.

The image displayed on the CRT 17 is reflected off the half mirror 20, such as a semi-transparent half-silvered mirror to permit the image to be viewed from the players standing by the satellites 3. The half mirror 20 is tilted at 45° and extends from ahead of the black lights 15 toward the underlying table 5, the black lights 15 being mounted at the top of the rear surface of the upright portion 2. Therefore, the players feel as if the dealer 4 standing between the table 5 and the georama that is the far view seen through the half mirror 20.

In the above examples, the CRTs are used as display units displaying the dealer and cards. The display units are not limited to CRTs. Mechanical display units or liquid-crystal displays can also be employed. Also in the illustrated examples, plural satellites are juxtaposed. Of course, it is only necessary that at least one satellite be provided, operated by a player.

The game machine 1 constructed as described above operates as follows. The illuminations 12 suggestive of a casino are installed on the billboard 11. The flowing illuminant suggestive of a casino building allures people to play games.

At least one satellite 3 is provided. In these examples, 5 satellites 3 are provided. A player stands by any one of the satellites 3. The spotlights 19 inside the guide plates 18 are lit up to project instructions for urging the player to bet medals onto the half mirror 20. Then, he or she inserts the medals (not shown) into the medal slot 7 under the instructions. The number of the medals is displayed on the CRT 8 of the satellite, and preparations are made for the game. The announcement that the betting is complete is made through loudspeakers 21 shown in FIG. 1. Simultaneously, the spotlights inside the guide plates go out. The instructions displayed on the half mirror 20 disappear. Thus, the game is started.

First, the image of the dealer 4 is displayed on the CRT 17. On this CRT, the dealer 4 takes out cards by hand, shuffles and distributes them. At the same time, the faces of the player's cards are displayed on the CRT 8 of the satellite located ahead of the player. The backs of the dealer's cards are displayed on the CRT 6 installed on the table 5 of the dealer 4.

When two cards are placed on each table, the dealer 4 notifies through the speakers 21 that the player is able to bet additional cards. If the player takes the addition as necessary, he or she depresses the operation buttons 9 corresponding to the instructions to demand the additional cards. In response to this, the images of the additional cards are displayed on the CRT 8 of the satellite in front of the requester, as well as the cards already displayed.

Finally, the player's cards are confronted with the dealer's cards. If the player wins, then medals are delivered to the medal pan 10, or the number of coins displayed on the satellite CRT 8 increases. Conversely, if the player loses, then the bet medals are forfeited.

The image of the upper part of the dealer is displayed on the CRT 17 located behind the billboard such that the dealer's head lies in the rearmost position. This image is projected on the half mirror 20 installed at an angle of 45°. The player standing by one satellite 3 sees the virtual image of the upper part of the dealer, the virtual image being located on the vertical surface 22 extending along the rear surface of the upright portion 2. The image on the CRT 17 and the virtual image are symmetrical with respect to the plane of the mirror 20.

Furthermore, the player standing by the satellite 3 sees the georama through the half mirror 20 at a position behind the position at which the virtual image of the dealer is created. In addition, the player sees the table 5 in front of the virtual image of the dealer. Since the images of cards on the CRT 6 on the table 5 are displayed on the plane crossing the virtual image of the dealer 4 on the vertical surface 22, the player feels as if the standing dealer 4 placed cards on the table 5. In this way, three-dimensionality is provided.

In the description made thus far, the CRT 6 displaying the cards of the dealer 4 is mounted in the center of the table 5. This arrangement can be simplified. In particular, the images of cards displayed on the CRT 6 can be displayed on the CRT 17. That is, the CRT 17 can display the images of the distributed dealer's cards, as well as the image of the dealer 4 who is allotting the cards.

The georama is constantly illuminated by the black lights 15 from above to show up the luminous paint applied to some parts of the background. The illumination of the spotlights 16 accentuates the three-dimensionality of the semicylindrical pillars 14 which form a near view. When the dealer 4 is replaced with another person, the spotlights 16 and the image of the dealer on the CRT 17 are made to go out gradually. Thus, the player feels as if the dealer 4 retired behind the georama and another dealer went in. The spotlights 16 can be made to go on and off to stimulate the atmosphere at the time of the advertisement or at the instant when the jackpot was determined before the playing is initiated.

With the novel medal game machine constructed as described above, the player engaging in a game not only sees the cards displayed on the viewing screen of a CRT but also the image of a dealer between the georama as the table, and the dealer distributes cards. Furthermore, the progress of the game is guided by the dealer's speech. The player feels as if the georama constituting the background and the image of the dealer were combined in three dimensions. Hence, the player feels as if the player were playing a game opposite to a real dealer in a real casino. In this manner, the invention offers a very interesting medal game machine.

What is claimed is:

1. A game machine to enable a player to play a game while viewing a realistically appearing scene of the game, comprising:
    a housing member having an open central portion with an elevated rear surface and a horizontal surface extending at the bottom of the open central portion;

a background scene positioned on the elevated rear surface of the open central portion to complement the specific game play;

at least one operator unit positioned adjacent the housing member with operator controls for viewing the open central position and enabling game play;

a first display unit connected to the housing member to extend above and over at least a portion of the open central portion for projecting a first display image downward into the open central portion;

a second display unit operatively positioned adjacent the horizontal surface and substantially immediately under the first display unit to provide a second display image, and a semi-transparent mirror positioned in front of the elevated rear surface and above the horizontal surface to reflect the first display image while transmitting the background scene through the semi-transparent mirror whereby the player can view the combination of the first and second display images and background scene as a composite image simulating a playing mode of the game.

2. The game machine of claim 1 further including lighting means for illuminating the background scene.

3. The game machine of claim 1 further including means for projecting information onto the semi-transparent mirror adjacent the first display unit.

4. The game machine of claim 1 further including a third display unit positioned at the operator unit.

5. The game machine of claim 4 further including a plurality of operator units.

6. A game machine adapted to permit a player to bet coins on a game, said game machine comprising:

a housing member having an open central portion on its front side and an upper portion extending over the open central portion;

a first display unit mounted in the center of the upper portion of the housing member, the viewing screen of the display unit facing downward;

a flat half-silvered mirror located below the first display unit and inclined at an angle of about 45 degrees so as to extend downwardly from a rear side of the housing member towards the front of the housing member;

a flat plane surface simulating a table and located below the open central portion of the front side of the housing member, the flat plane surface extending inwardly of the housing member;

a second display unit fixedly mounted adjacent the flat plane surface and substantially immediately under the first display unit;

a georama forming a background scene and fixedly mounted on the rear surface of the housing member behind a position at which a virtual image of any picture on the first display unit is created by the half-silvered mirror;

lighting members equipped with dimmer controls for illuminating the georama, and operator units mounted outside the front of the housing member to be operated by players.

7. A game machine adapted to permit a player to engage in a game of chance, said game machine comprising:

a housing member having an open central portion on its front side and an upper portion extending over the open central portion;

a first display unit with a viewing screen mounted in the upper portion of the housing member, the viewing screen of the display unit facing downward;

a flat semi-transparent half mirror located below the first display unit and inclined at an angle of about 45 degrees to extend downwardly from a rear side of the housing member, the half mirror creating a virtual image of any picture on the viewing screen of the first display unit such that the picture on the viewing screen of the first display unit and the virtual image are located symmetrically with respect to the half mirror;

a member simulating a table and located below the open central portion of the front side of the housing member, the member extending inwardly of the housing member, a rear side of the member being close to a plane on which the virtual image is created;

a second display unit fixedly mounted to the member and substantially positioned immediately under the first display unit;

a georama forming a background scene complementary to the game and fixedly mounted on the rear surface of the housing member behind the position at which the virtual image of the picture on the first display unit is created by the semi-transparent half mirror;

lighting members on the housing member for illuminating the georama, and operator units positioned outside the front of the housing member to be operated by players.

8. The game machine of claim 7 wherein each operator unit has a display unit, a control portion, and a coin receiver, all of which are mounted on top of the operator unit.

* * * * *